Oct. 22, 1968   J. L. PERRY   3,406,857
INSULATED PLASTIC VESSEL
Filed Dec. 9, 1964

INVENTOR.
JAMES L. PERRY
BY
Jonathan C. Clout
ATTORNEY

United States Patent Office 3,406,857
Patented Oct. 22, 1968

3,406,857
INSULATED PLASTIC VESSEL
James L. Perry, Totowa, N.J., assignor to Air Reduction Company, Incorporated, New York, N.Y., a corporation of New York
Filed Dec. 9, 1964, Ser. No. 417,163
20 Claims. (Cl. 220—9)

ABSTRACT OF THE DISCLOSURE

The invention relates to a two-walled vessel for the storage of cryogenic liquids. The vessel walls are constructed of layers of kraft paper impregnated with phenol-formaldehyde resin and then cured. Each wall has at least one lamination of a low permeability material.

---

The present invention is related to two-walled vessels for the storage of liquids at temperatures substantially different from ambient. More particularly, the invention is concerned with the construction of two-walled vessels so as to overcome some of the disadvantages of present vessels and in using techniques in the construction that allow for a better yet more economic product.

In the past such vessels have been constructed of various substances, but most commonly glass, stainless steel, aluminum, and plastic. Glass, stainless steel, and aluminum have been used in applications covering a wide range of temperatures, but the plastic due to some of its characteristics has only been given use in a limited temperature range.

It is therefore an object of this invention to provide a two-walled insulating vessel usable over wide temperature ranges such as with glass and stainless steel while eliminating some of the objections to such materials.

It is a further object to provide a two-walled vessel which is constructed so as to be both substantially non-porous and retain its flexibility at both low and high temperatures.

It is a further object to provide a light weight yet durable two-walled vessel for storage of cryogenic fluids constructed of a plastic which will effectively hold a vacuum and not become brittle.

It is a further object to provide a laminated plastic thermally insulated vessel usable for storing fluids at temperatures ranging from fluids at cryogenic temperature to substantially above ambient.

These and other objects of this invention will become apparent from the following descriptions and drawings in which.

Figure 1:
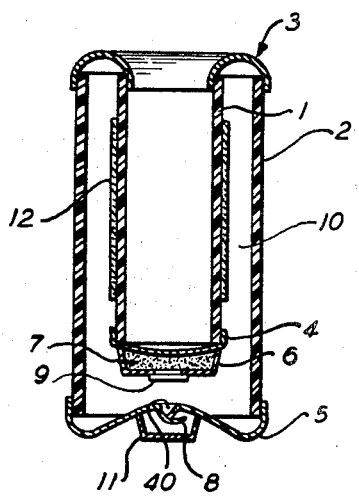
FIGURE 1 is a sectional elevational view of a two-walled vessel constructed according to the invention.

Two-walled vessels for the preservation of fluids at extremes from ambient temperatures as mentioned above, have been constructed of glass, stainless steel, aluminum, and molded plastic for years. Each of these substances, while very desirable for certain of its traits, has characteristics which limit its use.

Stainless steel is durable and useful in applications over a wide temperature range, and is capable of holding a high vacuum for long periods of time. However, the stainless steel vessel has disadvantages relating to weight, specific heat, thermal conductivity, and cost, for example.

The weight problem associated with using stainless steel is obvious and need only be mentioned.

Specific heat in the context used relates to the amount of heat that a specific amount of the steel used as a construction material for a double walled storage vessel can store. Stainless steel, of course, has a relatively high specific heat, and this becomes important when first introducing the fluid to be stored into the storage vessel. The vessel before receiving the fluid is at ambient temperature and must be lowered to the temperature of the fluid, if a cold fluid is to be stored, which means it must surrender a portion of its stored heat. In practice, this heat is surrendered to the initial fluid introduced into the vessel, vaporizing the fluid which boils off into the atmosphere, resulting in what is referred to as the "cool down" loss. The higher the specific heat of a substance, the more liquid is lost in cooling the vessel for storage of a cold fluid.

Another measure of fluid loss is the holding time of any particular vessel. Especially in open vessels the fluid is continually being lost to the atmosphere as heat is absorbed from the surrounding envionment, in the case of storage of a cold fluid. A large portion of this just-mentioned heat is conducted down the walls of the vessel to the fluid and is referred to as the heat-in leak. The size of the heat-in leak loss is a function of the conductivity of the path the heat must follow and the size of the path. Since stainless steel has a relatively high thermal conductivity, it will have a relatively high heat-in leak loss. It must be recognized at this point that in many applications it is desirable to have a large opening in the vessels, as they are often open tanks into which articles are dipped for freezing purposes in storage of cold fluids. If the vessel opening is small the efficiency of the dipping operation must obviously suffer, as an increase in the vessel opening results in an increased loss of fluid due to boiling off. Regardless of which alternative a user selects, he is just attempting to minimize his losses. The thermal conductivity of steel is also detrimental in closed tanks, used for storage of cold fluids, for example, as outside heat is easily conducted through the walls and the only barrier remaining is the space between the walls through which heat mad radiate. The foregoing statements concerning heat-in leaks are directed to an application where the fluid is below ambient, but they are also relevant to the heat-out leaks where the stored fluid is at a higher than ambient temperature.

Aluminum vessels have been used to a limited extent, but aluminum is a more porous material than stainless steel or glass and also is not easily fabricated.

Glass vessels have many advantages over the stainless steel in certain applications. Glass is a very light material in comparison with steel and makes a more portable vessel. The heat storage capacity of glass and its thermal conductivity are also low and this results in lower cool down losses and longer holding times. There normally is a metal coating on the glass, but this is primarily for reflecting radiant heat and is so thin as to be not of much significance in evaluating the two just-mentioned losses.

The primary disadvantages of glass construction are its fragileness and cost in certain applications. The care which must be taken in handling glass items is well known to everyone, and glass vessels for storage of hot or cold fluids are subject to not only breakage from physical shock but also from thermal shock. Thermal shock takes place when a glass vessel of substantially ambient temperature is first brought into contact with the fluid of temperatures diverse from ambient to be stored. The portion of the vessel which first touches the fluid tends to change to the temperature of the fluid and this is accompanied by an expansion or contraction of that particular portion of the glass. Since glass is not a good conductor of heat, rather severe temperature gradients are set up and these often results in cracking against which handicapping precautions must be taken. Furthermore, the cost consideration in glass construction is a limiting factor where large vessels are desired.

A fourth commonly used material mentioned above for construction of double walled vessels is plastics. It was first considered as a likely material due to its known high electrical resistance (as this is a good indication of its low thermal conductivity). However, in the plastic used in the past only limited use has been possible, because of characteristics which do not suit it for use in wide temperature ranges where it was necessary to maintain airtight enclosures. Molded plastics are used for the construction of such vessels where temperatures encountered are not substantially diverse from ambient, for example, as low as the cryogenic range, and there is no need of a high vacuum. Further, plastic is quite often porous, in that a gaseous material is able to pass through a plastic wall, and it also out gases or gives off a gas by itself. A measure of the ability to pass a gas is the permeation rate, and a high permeation rate of the wall structure of double wall vessels for storage of fluids at temperatures diverse from ambient control the compositions of any substance which is in the space between the walls of such a vessel. In most applications this space between the walls is a vacuum, for insulation purposes, and if the walls of the vessel are of a porous material it is impossible to maintain the vacuum at an effective level for any extended period of time. It is immediately apparent that if the walls give off any gas, regardless of whether from passing a gas through the wall or from outgassing, the result would be detrimental to preservation of a vacuum. The preceding statements would also apply to a situation where the desire was to control the composition of an insulating gaseous mixture placed in the cavity between the walls of the double walled vessel.

At any one small range of temperatures it may be possible to obtain a plastic which has a suitable permeation rate and does not outgas, but none previous to my invention has been utilized in a double walled vessel which could maintain these properties over a wide range. Plastic exhibiting these characteristics at cryogenic temperatures became brittle and was unusable, and this accounts for glass and stainless steel still being the predominate materials used in cryogenic applications even though they also have objectionable features, several of which were discussed hereinbefore.

Although the invention has broad application, its advantages are most easily appreciated if a specific embodiment is described in comparison with conventional devices. For this reason an embodiment is illustrated in FIGURE 1 will be utilized in further describing the invention, but nothing in the disclosure hereinafter is to be construed as limiting the invention to that particular vessel shown in FIGURE 1.

FIGURE 1 is a two-walled vessel for the storage of fluids constructed according to the invention. The cylindrical walls 1 and 2 are arranged one within the other and connected together by a ring 3 in such a fashion as to leave an open annular space 10 between the walls. The top of the vessel is left open but the bottom of the walls are closed off by the use of end plates 4 and 5. It will be noted that the outer wall 2 extends below the inner wall so that an open space also exists between the end plates. Attached to the bottom of end plate 4 by means of a plate 6 is an absorbent 7. The absorbent is only included in vessels where space 10 is evacuated and serves the function of preserving the vacuum for a longer period by absorbing any gas that does leak into the space 10. A breather cap 9 is included in plate 6 for permitting any gases present to reach the absorbent 7. The lead tube 8 communicates with space 10 through a hole 40 in end plate 5 for the purpose of either evacuating the space or inserting a specific gaseous composition for specialized insulating applications. The cap 11 is for the protection of lead tube 8 after it has been sealed off. Insulating material 12 encircles the inner wall 1 and is primarily a barrier to radiant heat.

Figure 2:
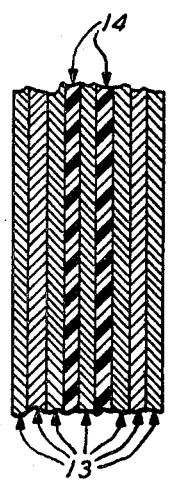
FIGURE 2 shows an illustration of one particular arrangement of laminations which could be used in constructing a two-walled vessel.

FIGURE 2 illustrates a cross section of the laminar structure of the laminated plastic which may be used in the construction of the walls and other elements of the invention. Each of the paper layers 13 have been impregnated with a phenol-fomaldehyde resin and then cured. The layers 14 are are a low permeation material, such as a regenerated cellulose film, and their purpose is to give the plastic selected an even lower permeation rate. The layers are all held together by the phenol-formaldehyde resin. The number of laminations in any particular vessel construction is primarily a function of the size of vessel and the thickness needed to maintain a rigid structure.

Figure 3:
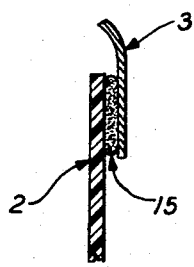
FIGURE 3 is a sectional fragmentary enlargement of the seal between a wall and top plate of FIGURE 1.

FIGURE 3 is an enlarged portion of FIGURE 1 showing the lap joint between the outer wall 2 and ring 3. The dark area 15 is an illustration of the polyurethane resin which forms the bond between the elements 2 and 3.

Structurally the vessel of FIGURE 1 is very similar to conventional two-walled vessels except for the materials used in the construction and the method by which the different pieces are connected. The walls 1 and 2 are constructed of a laminated plastic, as described. In selecting a plastic which would be useful in a vessel of this type for storage of fluids of temperatures substantially diverse from ambient, such as fluids of cryogenic temperature, several were tried and found unsatisfactory either because of porosity and outgassing or brittleness occurring. A plastic found by applicant to be of use, briefly described hereinbefore, is a laminated thermosetting plastic, for example, a phenol-formaldehyde impregnated paper base laminated thermosetting plastic. It is a hard, dense material with many desirable properties in combination. It is made by applying heat and pressure through the layers of paper which are impregnated with synthetic resins. The layers are usually of paper material and when the heat and pressure are applied, a chemical reaction (polymerization) is completed which transforms the separate layers into one solid mass. The structure of the resin is permanently changed from a fusible solidifiable state into an infusible solid one. The resulting laminated plastic has the property of retaining its flexible characteristics at cryogenic temperatures, and although the exact reason for the elasticity has not been ascertained, the elasticity of the paper along with the ability of the resin to yield between the laminations without actually breaking are desirable factors, since the flexibility protects the vessel against both thermal and physical shocks.

A low permeation material, preferably although not limited to a regenerated cellulose film, for example cellophane, is added to the plastic material, as described hereinbefore for additional laminations as it is highly impervious to gases and it bonds well to the other laminations. Several such materials exist, some of those tried including copper and aluminum foils and Mylar, but they proved less satisfactory than regenerated cellulose film, for example, because of, for example, bonding problems between the added and normal laminations incurred. The particular arrangements of the laminations shown in FIGURE 2 illustrates one particular positioning of the cellophane layers, but this is only for illustrative purposes and is not necessarily an arrangement of laminations that must be used. The regenerated cellulose film, again for example, may be located near the center as shown or near either surface without adversely affecting the other desirable characteristics of the plastic, and it is of course added as a lamination prior to the curing operation.

The desired permeation rate for the vessel walls described above may be advantageously compared to a conventional stainless steel vessel. Grade 304 stainless steel, which is a common material used in double walled vessels, has a permeation rate of $10^{-10}$ cubic centimeters per second of helium at a pressure of one atmosphere. Permeation rate tests on the plastic with two cellophane layers indicate it is less porous than the stainless steel. A Model MS–9A Veeco Mass Spectrometer leak detector was unable to sense any gas leak.

A simple, although optional, bonding method of joining overlapping surfaces of the double walled vessel was found, as illustrated in FIGURE 3, which is not as expensive as welding and also results in a better joint in the vessel discussed in relation to FIGURE 1. Because various different materials for construction of the various segments (walls, end plates, the plate 6, the breather cap, etc.) of the double wall vessel are utilized, the selection of a bonding agent is complicated. It is apparent from the disclosure with relation to FIGURE 1 and study of FIGURE 3 that the joint has to be such that it is not porous, so as to allow gas to enter space 10, and flexible throughout the range of temperatures substantially different from ambient, such as in the cryogenic temperature range. The flexibility requirement insures against the joint cracking under stresses caused by physical shock, and allows for shrinkage and expansion of the bonded materials at different rates where dissimilar materials are used. Applicant has found that a polyurethane base resin has all the characteristics just discussed and is capable of bonding plastic, aluminum, and stainless steel materials either to themselves or each other in a double walled vessel of the type disclosed hereinbefore, with a bond that is nonporous and flexible throughout a range from cryogenic temperatures to temperatures substantially above ambient, for example 212° F.

The joint shown in FIGURE 3, for example, is usually formed by preparing the surfaces 2 and 3 to be adhered by carefully cleaning them and then roughing up the surfaces with a fine abrasive cloth. The adhesive is then applied to the surfaces and they are then mated. The polyurethane resin adhesive will cure at room temperature, but the addition of heat speeds the process. It should be understood that a lap joint is shown in FIGURE 3 purely for illustrative purposes and the description is only illustrative of one application, wherein the two walls are of dissimilar materials (the walls 1 and 2 being of the plastic material described, and the plate structure most usually, but not mandatorily, being of metal, such as stainless steel. The end plates could be of other materials, such as aluminum or of the same plastic material as the walls.) Polyurethane resin adhesives are capable of binding diverse materials such as laminated plastic, stainless steel, and aluminum in a very satisfactory manner, so it is possible to vary the construction of the double walled vessel. Of course, other known methods of joining the various parts of the vessel may be employed.

A plastic open-top dewar (a two-walled vacuum insulated vessel for holding cryogenic fluids) has been constructed according to the configuration described in relation to FIGURE 1. The walls are constructed of a phenol-formaldehyde impregnated kraft paper base thermosetting laminated plastic as described hereinbefore, identified as Synthan, Grade XX paper base by Synthane Corporation. The wall dimensions of this construction are ⅛ in. thick for the outer wall and ¹⁄₁₆ in. thick for the inner wall, with an inside cavity with a 6 in. inner diameter and a 12 in. depth. The plastic has twenty-six laminations per ¼ in., with two internal cellophane laminations formed of 0.003 cellophane, as described hereinbefore, identified as Du Pont 150pd62. The top ring and end plates 3, 4 and 5 are stainless steel and are adhered to the walls by the use of a polyurethane adhesive as described hereinbefore consisting of Narmco Materials' resin 7343 with curing agent 7139. The absorbent used was Molorlector (sodium zeolite), and the insulation was a multilayer radiation barrier type composed of unwrinkled metallized Mylar, but many such well-known laminar type insulations could be used.

The vessel constructed is described in the preceding paragraph was tested at temperatures ranging from −452° F. (boiling helium) to approximately +300° F. and at vacuums from $10^{-6}$ millimeters of mercury to 1 atmosphere, and the results showed that the plastic and the polyurethane adhesive did not become porous or brittle. Comparison tests were performed on the above-described plastic dewar and comparable stainless steel and glass dewars. It was determined from holding time tests that 42% more heat leaked into the stainless steel dewar. This figure is significant in that for a given tolerable boil-off rate, plastic construction permits the use of a larger opening. This permits an increased efficiency in any dipping operation; or if an application is involved where there is no desire to increase the opening size, the advantage will simply be a reduction in the fluid lost to the atmosphere due to boiling off. The cool down loss comparisons revealed that seven times the loss sustained in cooling the plastic dewar was suffered in cooling the stainless steel vessel. Furthermore, the plastic vessel described above functions to store fluid of temperatures substantially diverse from ambient in a manner equivalent to the more costly and fragile glass vessel.

Figure 4:
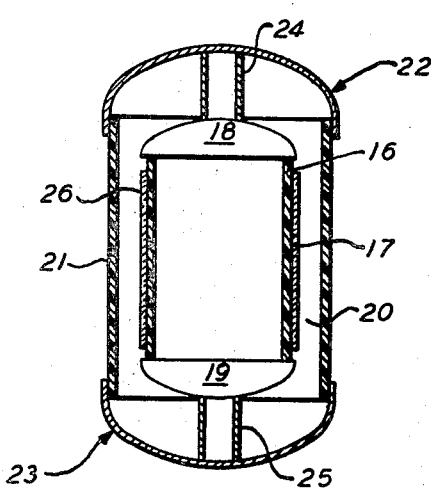
FIGURE 4 shows a sectional view of a storage tank constructed according to the invention.

Another embodiment of the invention is illustrated in FIGURE 4. This is a sectional view of a storage tank type vessel which is constructed according to the invention. The inner container is constructed of a hollow cylindrical plastic shell 17 closed at both ends by use of cover plates 18 and 19. The larger outer tank is also constructed of a cylindrical plastic shell 21 and two cover plates 22 and 23. The plastic shells 17 and 21 are of the laminated thermosetting plastic previously described. The inner container 16 is supported by means of supports 24 and 25 so as to leave an insulating space 20 between the walls on all sides, with the exception of the supported areas. This space 20 can be evacuated or filled with an insulating material or gas. Insulation 26 is shown encircling inner shell 17 and is for heat radiation protection. The advantages of such a tank constructed according to the invention are many fold. For example, where stainless steel or other metal construction is not tolerable, for reasons such as those previously discussed, such tanks have previously been impractical due to the extremely high cost of glass construction of large tanks. The polyurethane adhesive resin may be used to great advantage in the tank of FIGURE 4, for the reasons as described hereinbefore in relation to the double walled construction description above.

The examples and descriptions herein are for the purpose of illustrating particular applications of the invention and are not to be construed as limiting the invention to the particular embodiments disclosed. It will be readily apparent to those skilled in the art that many modifications and variations can be effected without departing from the scope of the invention. Therefore, it is intended that the invention be unrestricted except by the following claims.

I claim:

1. A vessel for storing fluids at temperatures ranging from cryogenic to substantially above ambient comprising, a first container, a second container larger than the first container, means for supporting said first container within said second container so as to leave a space therebetween, said space being a vacuum, said first and second containers having walls constructed of a thermosetting laminated plastic, containing at least one internal dissimilar lamination of a regenerated cellulose film, said laminated plastic being bonded to said at least one dissimilar lamination with thermosetting resin.

2. A vessel according to claim 1 wherein there are two or more of said dissimilar laminations with plastic laminations on both of their sides.

3. A vessel according to claim 1 wherein the space between the said containers contains an insulating material with a reflective barrier to minimize radiant heat transfer.

4. A vessel for storing cryogenic fluids comprising an inner container having a wall composed of thermosetting laminated plastic which holds the cryogenic fluid; and an outer container having a wall composed of thermosetting laminated plastic spaced from said inner container so as to leave a space therebetween, the space between the containers being a vacuum, supporting means connecting said inner and outer containers, the connection between said containers and supporting means being formed of a polyurethane resin which is nonporous and capable of remaining flexible at cryogenic temperatures.

5. A vessel according to claim 4 wherein the laminated plastic contains at least one dissimilar lamination of a low permeation material, thereby providing a more reliable nonporous laminated plastic.

6. A vessel according to claim 5 wherein the laminated plastic is a phenol-formaldehyde impregnated paper base thermosetting plastic including at least one lamination of regenerated cellulose film.

7. A vessel according to claim 5 wherein there are two or more of said dissimilar laminations with plastic laminations on both of their sides.

8. A vessel according to claim 7 wherein said laminated plastic is characterized by a low porosity and a lack of outgassing characteristics.

9. A vessel according to claim 8 wherein the space between the said containers contains an insulating material with a reflective barrier to minimize radiant heat transfer.

10. A two-walled vessel for storing cryogenic fluids at a temperature substantially different from ambient comprising, a first container, a second container larger than the first container, means for supporting said first container within said second container so as to leave a space therebetween, wherein the space between said containers is a vacuum, said first and second containers being constructed of a phenol-formaldehyde impregnated paper base thermosetting laminated plastic including at least one lamination of regenerated cellulose film, said laminated plastic characterized by a low porosity and a lack of outgassing characteristics.

11. A vessel according to claim 10, said regenerated cellulose film being cellophane.

12. A two-walled vessel for storing fluids at a temperature substantially different from ambient comprising, a first container, a second container larger than the first container, means for supporting said first container within said second container so as to leave a space therebetween said first and second containers being constructed of a thermosetting laminated plastic, said laminated plastic containing at least one dissimilar lamination of a low permeation material, wherein said laminated plastic comprises laminations of phenol-formaldehyde impregnated paper and said dissimilar lamination comprises a regenerated cellulose film.

13. A vacuum insulated storage vessel comprising, a first container supported within a second container and defining therebetween a vacuum space, at least one of said containers having a metal end plate connected to a thermosetting laminated plastic portion, the laminated plastic portion including at least one dissimilar lamination of a low gas permeation material, said laminated plastic portion comprising laminations of phenol-formaldehyde impregnated paper, said dissimilar lamination being positioned between said laminations of impregnated paper and comprising regenerated cellulose film bonded to said laminations with thermosetting resin.

14. A laminated plastic material suitable for use in vacuum insulated walls comprising at least two laminations of thermosetting resin impregnated base material and at least one dissimilar lamination of a regenerated cellulose film having a low gas permeation rate and being positioned between said laminations of base material, said film being bonded to the laminations of base material with thermosetting resin.

15. The plastic as defined in claim 14, wherein said base material is paper.

16. The plastic defined in claim 14, wherein said resin is phenol-formaldehyde.

17. A two-walled vessel for storing fluids at temperatures ranging from cryogenic to substantially above ambient comprising, a first container, a second container larger than the first container, means for supporting said first container within said second container so as to leave a space therebetween, said space being a vacuum, said first and second containers having walls constructed of a thermosetting plastic an at least one internal layer of cellophane, said plastic being bonded to said at least one layer with thermosetting resin.

18. A two-walled vessel for storing fluids at temperatures ranging from cryogenic to substantially above ambient comprising, a first container, a second cointainer larger than the first container, means for supporting said first container within said second container so as to leave a space therebetween, said space being a vacuum, said first and second containers having walls constructed of a thermosetting laminated plastic containing at least one dissimilar lamination of a low permeation material, wherein there is a bond between the supporting means and the containers formed of a polyurethane resin, said bond being nonporous in structure and retaining a flexible characteristic at cryogenic temperature.

19. In a vacuum insulated storage vessel, said vessel having two metal supporting surfaces, a themosetting laminated plastic extending between said two surfaces and interconnecting said surfaces, and thermosetting laminated plastic providing a vacuum barrier to insulate the contents of the vessel in association with the metal surfaces, the laminated plastic including at least one dissimilar lamination of a low permeation material, said laminated plastic being connected to the two supporting surfaces by means of an adhesive resin having nonporous and flexible characteristics at cryogenic temperatures.

20. A vessel according to claim 19 wherein the dissimilar lamination comprises a thin metal layer which is highly impervious to gas leak.

References Cited

UNITED STATES PATENTS

| 159,432 | 2/1875 | Matthews | 220—94 |
| 1,398,143 | 11/1921 | Novotny | 161—264 |
| 1,672,904 | 6/1928 | Randall | 220—9 |
| 1,972,307 | 9/1934 | Loetscher. | |
| 2,318,414 | 5/1943 | Palmer | 220—15 |
| 2,547,607 | 4/1951 | Sulfrian | 220—9 |
| 2,623,681 | 12/1952 | Wilcox | 229—3.5 |
| 2,900,800 | 8/1959 | Loveday | 220—9 |
| 3,069,045 | 12/1962 | Haumann et al. | 220—15 |
| 3,167,933 | 2/1965 | Beckman et al. | 220—9 |
| 2,643,021 | 6/1953 | Freedman | 220—9 |
| 3,225,954 | 12/1965 | Herrick et al. | 220—9 |

FOREIGN PATENTS

| 455,923 | 10/1936 | Great Britain. |

THERON E. CONDON, *Primary Examiner.*

JAMES R. GARRETT, *Assistant Examiner.*